Sept. 27, 1932.   R. S. BROWN   1,879,656
CHUCK
Original Filed April 20, 1926   2 Sheets-Sheet 1
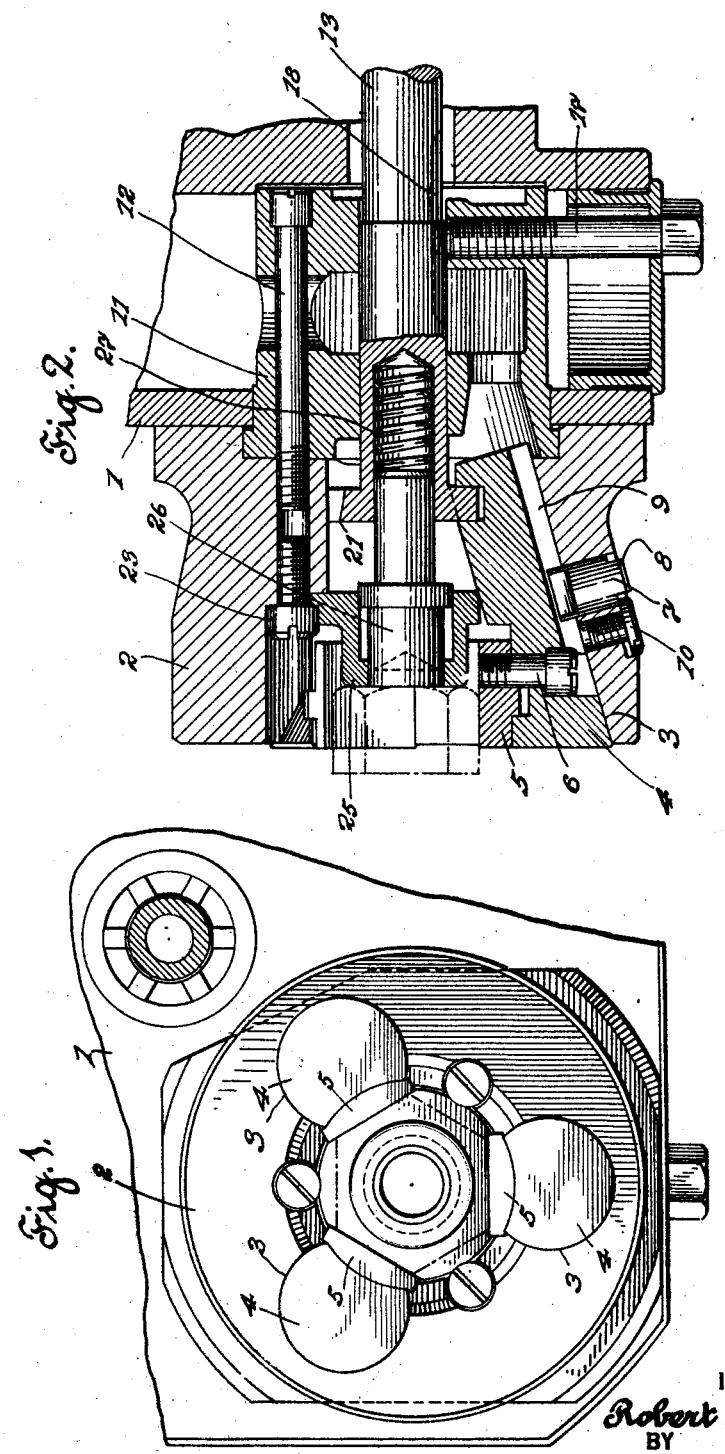
INVENTOR
Robert S. Brown
BY
ATTORNEYS.

Sept. 27, 1932. R. S. BROWN 1,879,656
CHUCK
Original Filed April 20, 1926 2 Sheets-Sheet 2
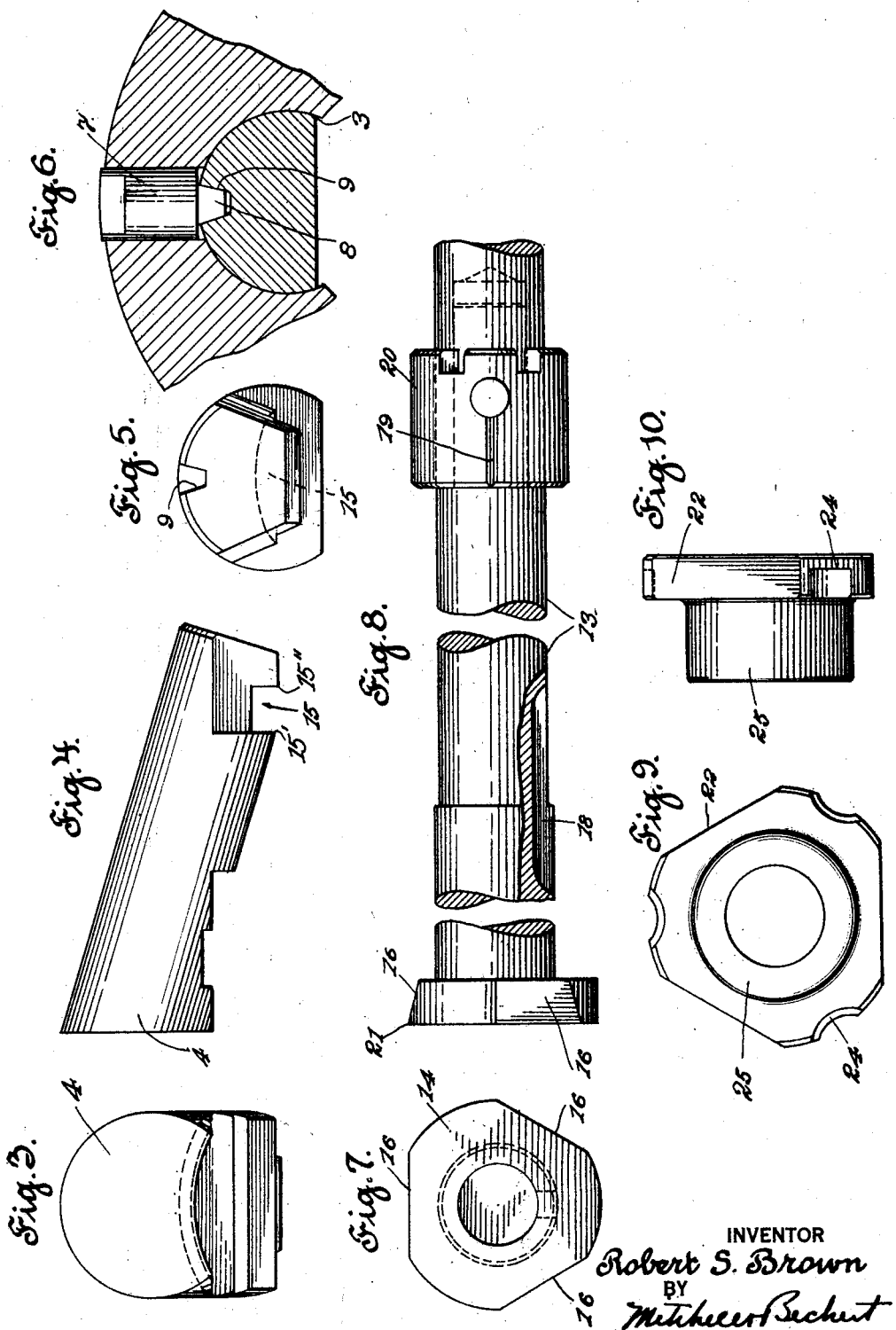
INVENTOR
Robert S. Brown
BY
Mitchell Bechtet
ATTORNEYS.

Patented Sept. 27, 1932

1,879,656

UNITED STATES PATENT OFFICE

ROBERT S. BROWN, OF NEW BRITAIN, CONNECTICUT, ASSIGNOR, BY MESNE ASSIGNMENTS, TO THE NEW BRITAIN-GRIDLEY MACHINE COMPANY, OF NEW BRITAIN, CONNECTICUT, A CORPORATION OF CONNECTICUT

CHUCK

Application filed April 20, 1926, Serial No. 103,194. Renewed July 25, 1931.

My invention relates to a chuck and is particularly, though not exclusively, adapted for use in a group of like chucks carried by a turret in an automatic chucking machine.

This application contains matter disclosed in my co-pending application, Serial No. 98,974, filed April 1, 1926.

It is the general object of the invention to provide an improved form of chuck which will be rapid acting, accurate and long lived.

Among other and more specific objects of the invention are: To provide a chuck which may be readily assembled and disassembled; to provide an improved work stop for positioning work articles in a chuck; to provide improved means for ejecting work articles from a chuck.

In the drawings which show, for illustrative purposes only, a preferred form of the invention—

Fig. 1 is a front view of a chuck embodying features of the invention and positioned upon a turret;

Fig. 2 is a central vertical, sectional view of the chuck shown in Fig. 1;

Fig. 3 is an end view in elevation of a chuck jaw;

Fig. 4 is a side view in elevation of a chuck jaw;

Fig. 5 is a view similar to Fig. 3 but showing the opposite end of the jaw and viewed along the axis thereof;

Fig. 6 is a sectional view of a chuck jaw, and means for preventing rotation thereof;

Fig. 7 is an end view in elevation of a chuck jaw actuator;

Fig. 8 is a fragmentary side view in partial section of the chuck jaw actuator or draw rod;

Fig. 9 is a front view in elevation of a work stop;

Fig. 10 is a view in side elevation of the work stop shown in Fig. 9.

The chuck will be described as held on a turret of an automatic chucking machine wherein a plurality of like chucks would be employed. It is to be understood, however, that the principles of the invention are of broader application, and the chuck may be employed in situations other than as herein shown, wherein the chuck is held stationary and the tools are adapted to rotate and act upon the work articles.

In said drawings, 1 indicates a part of a turret of an automatic chucking machine or the like. 2 indicates a chuck body which may be secured to the turret 1 by any suitable means, such as screws (not shown). The chuck body is provided with a plurality of bores 3—3 converging and preferably of cylindrical form. Jaws 4—4 also preferably of cylindrical form fit the bores 3—3 and may be supported therein for more than one-half of their circumferences, as will be clear from Fig. 1. By this means the jaws are definitely positioned in the bores and extensive bearing surfaces are provided so that wear will be slight and the chuck will be long lived.

While the chuck jaws 4—4 may be formed so as to grip any particular work article, it is preferred to provide suitable false jaws 5—5, which may be secured to prepared seats on the jaws 4—4. By forming false jaws having various gripping contours, all, however, having the same seating form on the jaws 4—4, it will be a relatively simple matter to change the false jaws to adapt the chuck for taking work articles of any particular shape. The false jaws 5 may be held in place on the jaws 4—4 by means of screws, such as 6, the heads of which preferably lie within the bores 3—3 and are therefore normally concealed and protected from chips and other foreign matter.

In order to prevent the jaws 4—4 from rotating in their respective bores, I provide suitable means, such as a key 7 having a flat tapered end 8, which may fit into a tapered or truncated substantially V-shaped groove or keyway 9 extending longitudinally of the jaws 4—4, but preferably terminating short of the forward ends. A suitable key screw 10 may be employed for advancing the key 7 into the groove. By means of the inclined or tapered key and keyway, any wear may be taken up and the jaws always held and guided properly.

In the particular form shown I employ a pilot 11 which, for convenience in manufacture, is made separate from but secured to the chuck body 2 as by means of screws such as 12. The jaws may be actuated by a draw rod 13 guided in the pilot 11, and moved by automatic or manual means so as to advance and retract the same. The forward end of the draw rod 13 may be provided with a flange or head 14 and each jaw has suitable abutment means preferably in the form of a groove 15 with which the head 14 coacts so as to advance and retract the jaws. By referring to Figs. 2, 7 and 8, it will be seen that the head 14 is of irregular shape, that is, it has slabbed off portions 16—16 preferably corresponding in number to the number of jaws, and the slabbed off parts may be inclined rearwardly at an angle, which is substantially the same as the angle at which the jaws are inclined to the axis of the chuck. It will be clear, therefore, that in assembling or disassembling the chuck, the draw rod 13 may be rotated to such a position that the slabbed off parts 16—16 are positioned above the grooves 15—15 in the respective chucks when the draw rod and the jaws are advanced so as to permit the positioning of the slabbed off portions above the grooves. Now, upon a partial rotation of the draw rod 13, the rounded portions, that is, the portions between the slabbed off portions will enter the grooves 15—15, and thereafter reciprocation of the draw rod 13 will move the chuck jaws correspondingly, and the actuating head 14 will remain in engagement with the respective jaws. When the jaws and draw rod are properly assembled so as to be in working position, I provide means, such as a screw 17, engaging in an elongated slot or keyway 18 in the draw rod. Therefore, after the parts are once assembled and the screw 17 turned up, reciprocation of the draw rod will always actuate the chuck jaws. It will be plain that since the engaging portions between the head 14 and the various chuck jaws are within the chuck body and are often concealed by other elements, it would be difficult to determine just when the actuating head 14 is in position to permit assembling or disassembling of a chuck jaw. Since the keyway 18 is also usually concealed, it would be difficult to cause the screw 17 to take into the keyway 18. I may therefore employ a suitable indication, such as a line 19, on a set collar 20 on a part of the draw rod which may be readily visible to an operator. This indication may have a registering indication on some fixed part of the machine, or it may be so positioned that when the indication 19 is on a horizontal or vertical plane through the axis of the draw rod, for example, the keyway 18 and screw 17 will be in the proper position to be engaged with each other. It is likewise sometimes difficult in assembling to position all of the jaws in proper positions so as to permit the head 14 to enter the respective grooves therein. I may therefore make one side such as the edge 15' of the groove 15 extend farther from the longitudinal axis of the jaw 15 than does the other edge 15'' so that when the jaws are entered into their respective bores, the projecting sides 15' of the grooves will abut against the edges 21—21 on the head 14 and thus definitely position all of the jaws so that the head may be rotated and the proper entry of the head into the groove 15—15 will be assured.

Now, when it is desired to position work articles, for example such as indicated in dot and dash lines in Fig. 2, a definite distance from the end of the chuck, I employ a work stop. In the form shown, the work stop includes a base portion 22, which is adapted to fit a seat within the chuck body and be held in place as by means of screws such as 23. The heads of these screws may be received in suitable seats 24—24 on the edge of the base portion 22 of the work stop. The forward part 25 of the work stop will be so formed that when the work article abuts there against, it will be held a definite predetermined distance from the end of the chuck. It will be observed that when such a work stop is employed the axial positioning of the work articles will be independent of the chuck jaws but any tendency of the work articles to move into closer engagement with the work stop will also move the jaws rearwardly and cause the work article to be wedged more tightly between the chuck jaws.

When the chuck is used on an automatic machine, such as an automatic chucking machine, it is desirable that the work articles be automatically ejected when the chuck jaws are moved to open position. In the preferred form, an ejecting plug 26 is guided through the work stop and is adapted to be projected or forced against the work article so as to automatically eject the same. The rear end of the ejector plug 26 may be guided in a bore in the forward end of the draw rod 13, and a spring 27 is interposed between the bottom of the bore and the end of the ejector plug 26. Now, when the draw rod 13 is moved toward the left, as viewed in Fig. 2, it will be seen that the jaws will be similarly moved and, due to their bearing for more than one-half of the circumferences in the bores 3—3 in the chuck body, the jaws will be positively caused to open so as to release the work article. The spring 27 will then force the ejector outwardly so as to eject the work article. Now, further movement of the rod 13 toward the left will cause the spring 27 to be compressed more than it is normally compressed, and the spring will force the ejector 26 outwardly and eject the work article provided this has not already been done due to the normal spring compression. When a work article is inserted in the open chuck, the operator, or automatic means in the case of an automatic feed, will force the work article against the ejector 26 until the work article abuts the work stop, when such a stop is provided, and the spring 27 will be compressed again. In the form shown the jaws are independent of the work stop and ejector, and the jaws may be removed without disturbing the work stop or ejector.

It will be seen that the exceedingly large bearing surfaces between the jaws and their corresponding seats will reduce wear to a minimum and thus this chuck is admirably adapted for an automatic machine in which the chucks may be opened and closed many thousands of times daily. It is to be further observed that the contact between the jaws and the bores in the chuck body are surface contacts and not mere line contacts, as when conical expander heads are employed as in some forms of chucks. By reason of the bores embracing the chuck jaws for more than half of their circumferences, the jaws will be positively held and be moved toward and away from each other by the bores. By means of the tapered key arrangement the chuck jaws will be positively held against rotation in their respective bores, and any wear may be compensated for. The chuck jaws may be readily assembled and disassembled by reason of the construction of the actuating head and the interfitting grooves in the chuck jaws. The same jaws may be employed for holding work articles of various configuration since it is only necessary to remove the jaws and secure false jaws thereon of the proper form for gripping any particular class of work desired.

While the invention has been described in some detail and in connection with parts of a turret, it is to be observed that the chuck may be employed singly and may be caused to rotate instead of being held in a stationary position and having the tools rotate. I do not wish to be strictly limited to the form shown since many changes may be made within the scope of the invention as defined in the appended claims.

I claim:

1. In a chuck, a chuck body having a plurality of converging cylindrical bores therein, cylindrical chuck jaws in said bores, each said jaw having a tapered longitudinal keyway therein, tapered keys in said body and coacting with said keyways to prevent rotation of said jaws in said bores, and a screw separated from but engaging each said key for maintaining the same in said keyways and for adjusting the same therein.

2. In a chuck, a chuck body having a plurality of converging bores therein, chuck jaws in said bores, said jaws having abutment means thereon, an actuating head to engage said abutment means for actuating said chuck jaws, said actuating head having slabbed off portions whereby, upon a partial rotation of said actuating head, said chuck jaws may be disengaged from said head.

3. In the combination defined in claim 2, said slabbed off portions being inclined to the axis of the chuck at substantially the same angle as said bores are inclined to such axis.

4. In a chuck, a chuck body having a plurality of converging bores therein, chuck jaws in said bores, said jaws having transverse grooves therein, an actuating head to engage with said grooves for actuating said chuck jaws, said head having slabbed off portions whereby, upon a partial rotation of said head, the jaws may be disengaged therefrom, and means for holding said head against rotation when in position to engage said jaws for moving the same.

5. In the combination defined in claim 4, indicating means for indicating the angular position of said actuating head relatively to said jaws.

6. In a chuck, a chuck body having a plurality of converging bores therein, chuck jaws in said bores, a pilot secured to said body, a draw rod guided by said pilot, a head on said draw rod to actuate said jaws and having depressed portions whereby, upon a partial rotation of said draw rod, said head may be disengaged from said jaws, and means for preventing rotation of said draw rod when said head is positioned so as to actuate said jaws.

7. In the combination defined in claim 6, and means for indicating the relative angular position between said draw rod and said jaws.

8. In a chuck, a chuck body, a pilot secured thereto, a draw rod guided in said pilot, said body having a plurality of converging bores therein, chuck jaws in said bores, means for causing said draw rod to actuate said jaws, a work stop secured to said body and positioned between said jaws so as to limit the extent to which a work article may be inserted into said body, an ejector mounted on said work stop, and a spring interposed between said draw rod and said ejector.

9. In a chuck, a chuck body having a plurality of converging bores therein, chuck jaws in said bores, a draw rod having means thereon to be engaged and disengaged from said chuck jaws on a partial rotation of said draw rod, said draw rod having a keyway therein, a key to engage said keyway and prevent rotation of said draw rod when said rod is in position to cause said jaws to be actuated thereby.

10. In the combination defined in claim 9, and indicating means for indicating the angular position of said draw rod relatively to said jaws.

11. In a chuck, a chuck body having a plurality of cylindrical bores converging toward each other, a cylindrical chuck jaw slidably and non-rotatably arranged in each said bore, said jaws being formed to grip a work article, a work support secured to said chuck body and having means extending into the spaces between adjacent jaws for supporting a work article in said chuck and in position to be gripped by said jaws, means for moving said jaws in said bores for gripping and releasing the work article, and a spring pressed plunger in said chuck body for ejecting a work article when said jaws are opened.

12. In a chuck, a chuck body having a plurality of cylindrical bores therein converging toward each other, a cylindrical chuck jaw in each said bore, said jaws being formed to grip a work article, means for preventing rotation of said jaws in said bores, a rod engaging the rear ends of said jaws and adapted to slide the same in said bores for causing the jaws to approach and recede from each other, said rod having a longitudinally extending bore therein, an ejecting plunger in said bore, a spring for urging said ejecting plunger outwardly, and means for limiting the outward movement of said ejecting plunger, said plunger serving to eject a work article from said chuck when said jaws are moved to the releasing position.

13. In a chuck, a chuck body, a plurality of chuck jaws guided therein, each jaw having a transverse notch therein, one side of each said notch extending farther from the longitudinal axis of said jaw than the other side of said notch, a chuck actuator for engagement in said notches and having slabbed off portions, whereby, upon a partial relative rotation between said actuator and said jaws said slabbed off portions will be free of one side of said notch.

14. In a chuck, a chuck body, a plurality of jaws movable therein, each jaw having a groove therein, a key extending into each groove, said key having a flat side surface engaging with a side of said groove, and a screw separate from said key and having a part engaging the latter for holding said key in position in said groove.

15. In a chuck, a chuck body, a jaw movable thereon, a key, said jaw and key having tapered interfitting surfaces of substantial area, and adjusting means for holding said key in adjusted positions relatively to said jaw.

16. In a chuck, a chuck body, a jaw having a bearing part of circular section, said body having an interfitting seat surface for said part of circular section, said jaw having a longitudinally extending tapered keyway therein, a tapered key held in said body and fitting said keyway whereby said keyway will hold said key against rotation, and an adjusting device carried by said body and engaging said key to hold the same in adjusted positions in said keyway.

17. In a chuck, a chuck body, a plurality of jaws, a jaw actuator, a work ejector comprising a spring, said jaw actuator and spring being connected whereby upon a jaw opening movement of said jaw actuator said spring will be thereby stressed to eject a work piece.

18. In a chuck, a chuck body, jaw means, jaw actuating means, connecting means between said jaw means and jaw actuating means and engageable with and disengageable from each other upon a partial relative rotation, and means for keying said jaw means and jaw actuating means against relative rotation when said two last mentioned means are engaged with each other.

ROBERT S. BROWN.